United States Patent
Jung et al.

(10) Patent No.: US 9,904,981 B2
(45) Date of Patent: Feb. 27, 2018

(54) IMAGE PROCESSING APPARATUS AND METHOD FOR COLOR-DEPTH DEMOSAICING

(71) Applicant: SAMSUNG ELECTRONICS CO., LTD., Suwon-si (KR)

(72) Inventors: Seung Won Jung, Seoul (KR); Kee Chang Lee, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 420 days.

(21) Appl. No.: 13/952,939

(22) Filed: Jul. 29, 2013

(65) Prior Publication Data
US 2014/0140608 A1    May 22, 2014

(30) Foreign Application Priority Data
Nov. 20, 2012 (KR) .......................... 10-2012-0131760

(51) Int. Cl.
G06T 3/40    (2006.01)

(52) U.S. Cl.
CPC .................................. G06T 3/4015 (2013.01)

(58) Field of Classification Search
None
See application file for complete search history.

(56) References Cited

U.S. PATENT DOCUMENTS

| | | | |
|---|---|---|---|
| 7,171,045 B1* | 1/2007 | Hamilton | 382/166 |
| 7,274,393 B2 | 9/2007 | Acharya | |
| 2004/0169748 A1 | 9/2004 | Acharya | |
| 2008/0075394 A1 | 3/2008 | Huang et al. | |
| 2010/0104214 A1 | 4/2010 | Tamburrino et al. | |
| 2011/0115886 A1* | 5/2011 | Nguyen et al. | 348/47 |
| 2011/0211754 A1* | 9/2011 | Litvak et al. | 382/165 |
| 2011/0285825 A1* | 11/2011 | Tian | H04N 9/646 |
| | | | 348/47 |

FOREIGN PATENT DOCUMENTS

| | | |
|---|---|---|
| KR | 10-2010-0011676 | 2/2010 |
| KR | 10-2010-0018449 | 2/2010 |
| KR | 10-2010-0132189 | 12/2010 |
| KR | 10-2011-0040402 | 4/2011 |

* cited by examiner

*Primary Examiner* — Sumati Lefkowitz
*Assistant Examiner* — Jiangeng Sun
(74) *Attorney, Agent, or Firm* — Harness, Dickey & Pierce, P.L.C.

(57) ABSTRACT

An image processing apparatus and method, which add depth information to a color pixel and add color information to a depth pixel in an image including the color pixel and the depth pixel includes a depth information determination unit to determine depth information of a current color pixel using peripheral color pixels of the current color pixel and peripheral depth pixels of the current color pixel.

10 Claims, 16 Drawing Sheets

IMAGE PROCESSING APPARATUS AND METHOD FOR COLOR-DEPTH DEMOSAICING

CROSS-REFERENCE TO RELATED APPLICATIONS

This application claims the priority benefit of Korean Patent Application No. 10-2012-0131760, filed on Nov. 20, 2012, in the Korean Intellectual Property Office, the disclosure of which is incorporated herein by reference.

BACKGROUND

1. Field

The following description relates to an image processing apparatus and method that adds depth information to a color pixel and adds color information to a depth pixel, in an image including the color pixel and the depth pixel.

2. Description of the Related Art

To reduce cost for hardware, a color camera senses only one color component per pixel, rather than sensing all red, green, and blue (RGB) values from each pixel. Therefore, image processing needs to be performed according to a color demosaicing method which adds color components not sensed by pixels in an image sensed by the color camera.

With development in a 3-dimensional (3D) image technology, interest is increasing in a technology for acquiring color information and depth information simultaneously by a single sensor.

To acquire color information and depth information simultaneously, for example, a color camera may be used, which senses only one color component or only depth information per pixel.

However, because the depth information is not equivalent to the color component, it is impractical to add the depth information to a pixel indicating the color component using a conventional color demosaicing method.

Accordingly, there is a need for a method for processing an image including color information and depth information.

SUMMARY

The foregoing and/or other aspects are achieved by providing an image processing apparatus including a depth information determination unit to determine depth information of a current color pixel using peripheral color pixels of the current color pixel and peripheral depth pixels of the current color pixel.

The depth information determination unit may include a peripheral depth pixel weight determiner to determine weights of the peripheral depth pixels using at least one of the peripheral color pixels, and a color pixel depth information determiner to determine depth information of the current color pixel by applying the weights of the peripheral depth pixels to depth information of the peripheral depth pixels.

The peripheral depth pixel weight determiner may determine the weights of the peripheral depth pixels located between the current color pixel and the peripheral color pixels, using weights of the peripheral color pixels determined according to a result of comparison between the current color pixel and the peripheral color pixels.

The peripheral depth pixel weight determiner may determine the weights of the peripheral depth pixels using a difference between depth information of symmetrical depth pixels and depth information of the peripheral depth pixels, and the symmetrical depth pixels may be symmetrical to the peripheral depth pixels with respect to the peripheral color pixels.

The peripheral depth pixel weight determiner may use peripheral color pixels having a same channel as the current color pixel, among peripheral color pixels located within a predetermined region with respect to the current color pixel, when the current color pixel is any one of red, green, and blue (RGB) channels.

The foregoing and/or other aspects are also achieved by providing an image processing apparatus including a color information determination unit to determine color information of a current depth pixel using peripheral color pixels of the current depth pixel and peripheral depth pixels of the current depth pixel.

Color information determination unit may include a peripheral color pixel weight determiner to determine weights of the peripheral color pixels using at least one of the peripheral depth pixels, and a depth pixel color information determiner to determine color information of the current depth pixel by applying the weights of the peripheral color pixels to color information of the peripheral color pixels.

The peripheral color pixel weight determiner may determine the weights of the peripheral color pixels located between the current depth pixel and the peripheral depth pixels, using weights of the peripheral depth pixels determined according to a result of comparison between the current depth pixel and the peripheral depth pixels.

The peripheral color pixel weight determiner may determine the weights of the peripheral color pixels using a difference between color information of symmetrical color pixels and color information of the peripheral color pixels, and the symmetrical color pixels may be symmetrical to the peripheral color pixels with respect to the peripheral depth pixels.

The foregoing and/or other aspects are also achieved by providing an image processing method including determining depth information of a current color pixel using peripheral color pixels of the current color pixel and peripheral depth pixels of the current color pixel.

The foregoing and/or other aspects are also achieved by providing an image processing method including determining color information of a current depth pixel using peripheral color pixels of the current depth pixel and peripheral depth pixels of the current depth pixel.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the example embodiments, taken in conjunction with the accompanying drawings of which.

DETAILED DESCRIPTION

Figure 1:
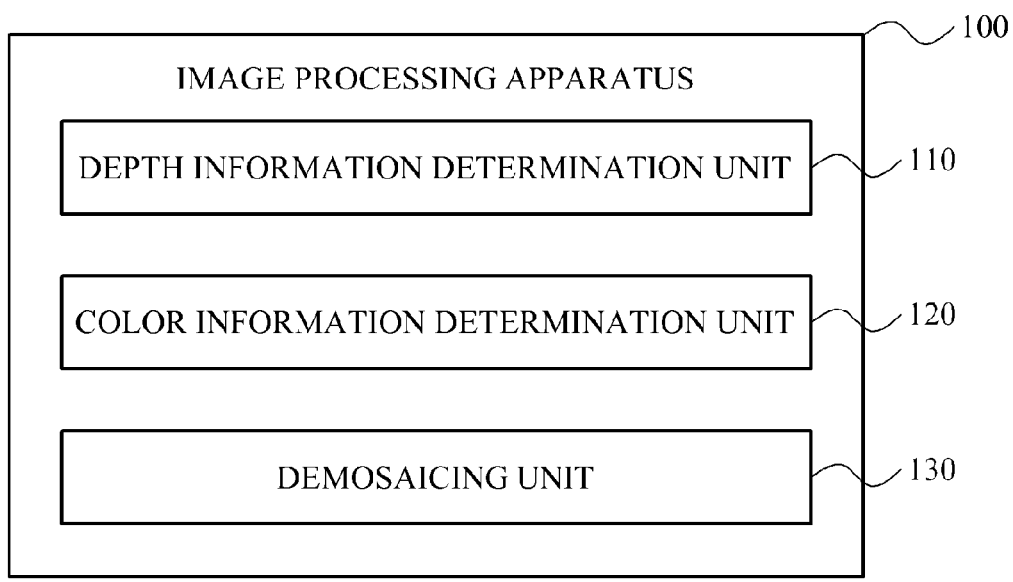
FIG. 1 illustrates configuration of an image processing apparatus according to example embodiments.

Reference will now be made in detail to example embodiments, examples of which are illustrated in the accompanying drawings, wherein like reference numerals refer to the like elements throughout. Example embodiments are described below to explain the present disclosure by referring to the figures.

FIG. 1 illustrates configuration of an image processing apparatus 100 according to example embodiments.

The image processing apparatus 100 may perform color-depth demosaicing that adds depth information to a color pixel of an input image and adds color information to a depth pixel of the input image, so that every pixel of the input image includes color information and depth information.

The input image may include color pixels indicating red, green, and blue (RGB) channels, respectively, and a depth pixel indicating depth information. The input image to be processed by the image processing apparatus 100 will be described with reference to FIG. 2.

Referring to FIG. 1, the image processing apparatus 100 may include a depth information determination unit 110, a color information determination unit 120, and a color demosaicing unit 130.

The depth information determination unit 110 may determine depth information of a current color pixel, using peripheral color pixels of the current color pixel and peripheral depth pixels of the current color pixel.

In detail, the depth information determination unit 110 may estimate relationship between the peripheral depth pixels and the current color pixel using the peripheral color pixels of the current color pixel. Next, the depth information determination unit 110 may determine depth information corresponding to the current color pixel, based on the relationship and depth information of the peripheral depth pixels, and add the determined depth information as the depth information of the current color pixel.

The configuration and operation of the depth information determination unit 110 will be described in further detail with reference to FIG. 3.

The color information determination unit 120 may determine color information of a current depth pixel, using peripheral color pixels of the current depth pixel and peripheral depth pixels of the current depth pixel.

In detail, the color information determination unit 120 may estimate relationship between the peripheral color pixels and the current depth pixel, using the peripheral depth pixels of the current depth pixel. Next, the color information determination unit 120 may determine color information corresponding to the current depth pixel based on the relationship and color information of the peripheral color pixels, and add the determined color information as the color information of the current depth pixel.

The configuration and operation of the color information determination unit 120 will be described in further detail with reference to FIG. 8.

The color demosaicing unit 130 may perform a color demosaicing process with respect to the color pixels of the input image. In detail, the color demosaicing unit 130 may add color information of a G channel and color information of a B channel to a first color pixel indicating an R channel among the color pixels, so that the first color pixel includes all of color information of the R channel, the color information of the G channel, and the color information of the B channel.

In addition, the color demosaicing unit 130 may add the color information of the R channel and the color information of the B channel to a second color pixel indicating the G channel among the color pixels, so that the second color pixel includes all of the color information of the R channel, the color information of the G channel, and the color information of the B channel.

Also, the color demosaicing unit 130 may add the color information of the R channel and the color information of the G channel to a third color pixel indicating the B channel among the color pixels, so that the third color pixel includes all of the color information of the R channel, the color information of the G channel, and the color information of the B channel.

The color demosaicing unit 130 may perform a general color demosaicing process.

The image processing apparatus 100 may include only the depth information determination unit 110 and perform only operation of adding the depth information to the color pixel of the input image. Alternatively, the image processing apparatus 100 may include only the color information determination unit 120 and perform only operation of adding the color information to the depth pixel of the input image. Here, the user may demosaic the color pixel added with the depth information and the depth pixel added with the color information, using a separate demosaicing apparatus.

Figure 2:
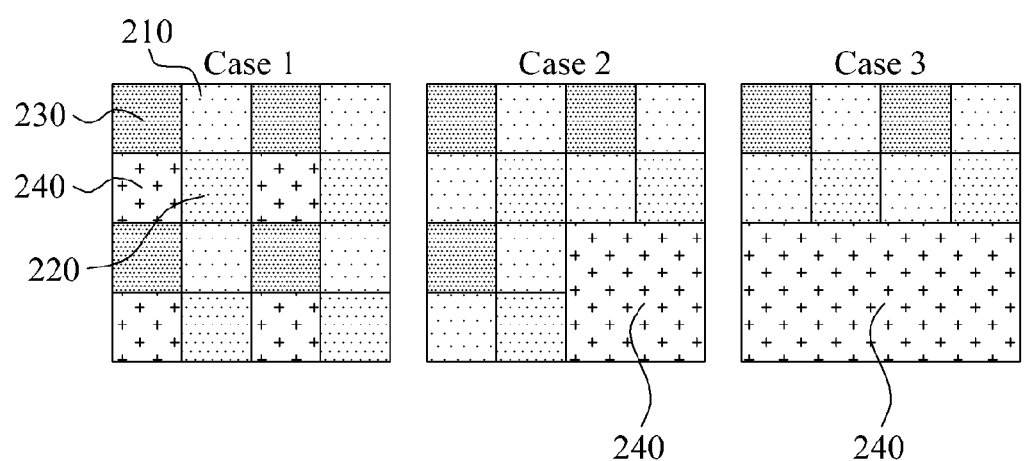
FIG. 2 illustrates an input image of an image processing apparatus according to example embodiments.

FIG. 2 illustrates an input image of an image processing apparatus according to example embodiments.

The input image of the image processing apparatus 100 may include a first color pixel 210 indicating an R channel, a second color pixel 220 indicating a G channel, a third color pixel 230 indicating a B channel, and a depth pixel 240 indicating depth information, as shown in FIG. 2.

The input image may have a Bayer pattern according to which the first color pixel 210, the second color pixel 220, the third color pixel 230, and the depth pixel 240 divide the input image into a checkerboard form as shown in Case 1.

However, according to performance of a depth camera for obtaining depth information, accuracy of the depth information may be lower than accuracy of the color information. In this case, the input image may include the depth pixel 240 larger than the first color pixel 210, the second color pixel 220, and the third color pixel 230 to indicate low-accuracy depth information as in shown Case 2.

Here, the size of the depth pixel 240 may be determined according to the performance of the depth camera for obtaining depth information. For example, when the performance of the depth camera is relatively low, the input image may include the depth pixel 240 almost eight times as large as the first color pixel 210, the second color pixel 220, and the third color pixel 230, as shown in Case 3.

That is, the input image may include various sizes of the depth pixel 240 as shown in FIG. 2.

Figure 3:
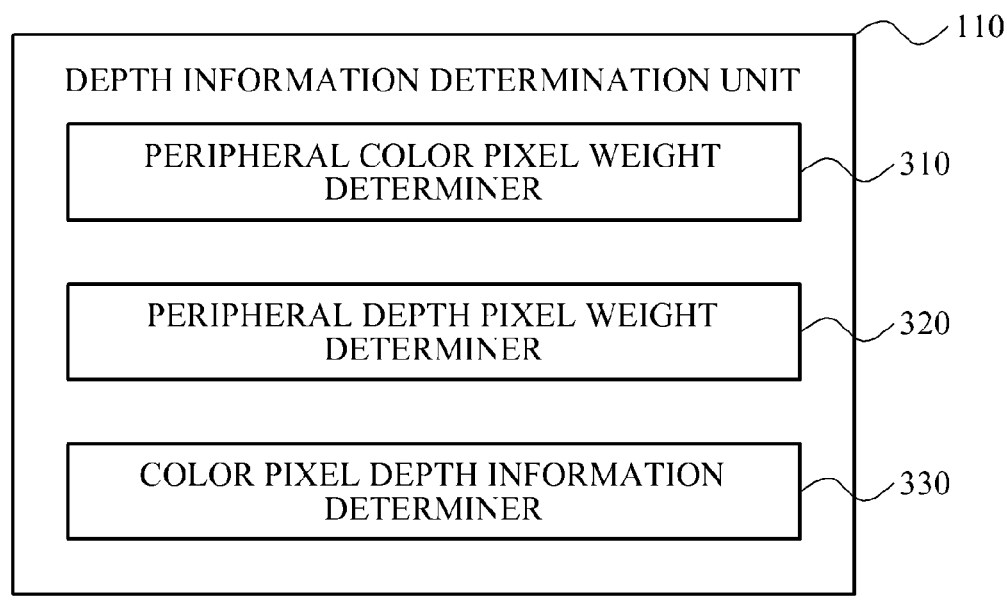
FIG. 3 illustrates configuration of a depth information determination unit according to example embodiments.

FIG. 3 illustrates configuration of the depth information determination unit 110 according to the example embodiments.

Referring to FIG. 3, the depth information determination unit 110 may include a peripheral color pixel weight determiner 310, a peripheral depth pixel weight determiner 320, and a color pixel depth information determiner 330.

The peripheral color pixel weight determiner 310 may determine weights of peripheral color pixels indicating a same channel as a current color pixel. In detail, the peripheral color pixel weight determiner 310 may compare a pixel value of the current color pixel to pixel values of the peripheral color pixels, and determine the weights of the peripheral color pixels according to the comparison result. For example, as a difference in pixel value between the current color pixel and the peripheral color pixels is smaller, the weights of the peripheral color pixels may be determined to be higher.

Here, the peripheral color pixel weight determiner 310 may determine the weights of the peripheral color pixels using a filter such as a bilateral filter and a sigma filter.

When the current color pixel is any one of RGB channels, the peripheral color pixel weight determiner 310 may determine weights of peripheral color pixels having same channels as the current color pixel, among peripheral color pixels located within a predetermined region with respect to the current color pixel.

For example, when the current color pixel is the G channel and depth pixels adjoin the current color pixel in a diagonal direction as shown in Case 1 of FIG. 2, the peripheral color pixel weight determiner 310 may determine weights of color pixels adjoining four depth pixels which adjoin the current color pixel in the diagonal direction.

In addition, when the current color pixel is the R channel and depth pixels adjoin a left side and a right side of the current color pixel as shown in Case 1 of FIG. 2, the peripheral color pixel weight determiner 310 may determine weights of color pixels adjoining the two depth pixels which adjoin the current color pixel on the left and the right.

When the current color pixel is the B channel and depth pixels adjoin an upper side and a lower side of the current color pixel as shown in Case 1 of FIG. 2, the peripheral color pixel weight determiner 310 may determine weights of color pixels adjoining the two depth pixels which adjoin the upper side and the lower side of the current color pixel.

In the foregoing embodiments, the color pixels and the depth pixels are arranged in a same manner as in Case 1 of FIG. 2. When arrangement of the color pixels and the depth pixels is different from Case 1 of FIG. 2, peripheral color pixels, of which weights are determined by the peripheral color pixel weight determiner 310, may be determined according to an arrangement direction of the depth pixels.

The peripheral depth pixel weight determiner 320 may determine weights of the peripheral depth pixels, using the weights of the peripheral color pixels determined by the peripheral color pixel weight determiner 310. In detail, the peripheral depth pixel weight determiner 320 may determine the weights of the peripheral depth pixels, by combining all the weights of the peripheral color pixels determined by the peripheral color pixel weight determiner 310.

Here, the peripheral depth pixel weight determiner 320 may determine the weights of the peripheral depth pixels, using a difference between depth information of symmetrical depth pixels and depth information of the peripheral depth pixels. Here, the symmetrical depth pixels may refer to depth pixels symmetrical with the peripheral depth pixels with respect to the peripheral color pixels.

To be more specific, the peripheral depth pixel weight determiner 320 may compensate weights of directions corresponding to the peripheral color pixels to be inversely proportional to the difference between the depth information of the symmetrical depth pixels and the depth information of the peripheral depth pixels. Next, the peripheral depth pixel weight determiner 320 may determine the weights of the peripheral depth pixels by combining the compensated weights.

That is, the peripheral depth pixel weight determiner 320 may reflect an edge of the depth information indicated by the depth pixel to the weights of the peripheral depth pixels, by compensating the weights of the peripheral color pixels located between corresponding depth pixels according to the difference between the depth pixels. For example, the peripheral depth pixel weight determiner 320 may increase the weights of the peripheral color pixels located in a direction of corresponding symmetrical depth pixels, according to a decrease in the difference between the symmetrical depth pixels and the peripheral depth pixels.

The color pixel depth information determiner 330 may determine the depth information of the current by applying the weights of the peripheral depth pixels to the depth information of the peripheral depth pixels. For example, the color pixel depth information determiner 330 may divide a sum of values obtained by applying the weights of the peripheral depth pixels to the depth information of the peripheral depth pixels, by a number of the peripheral depth pixels, thereby determining the depth information of the current color pixel.

Here, the color pixel depth information determiner 330 may add the determined depth information as the depth information of the current color pixel.

Figure 4:
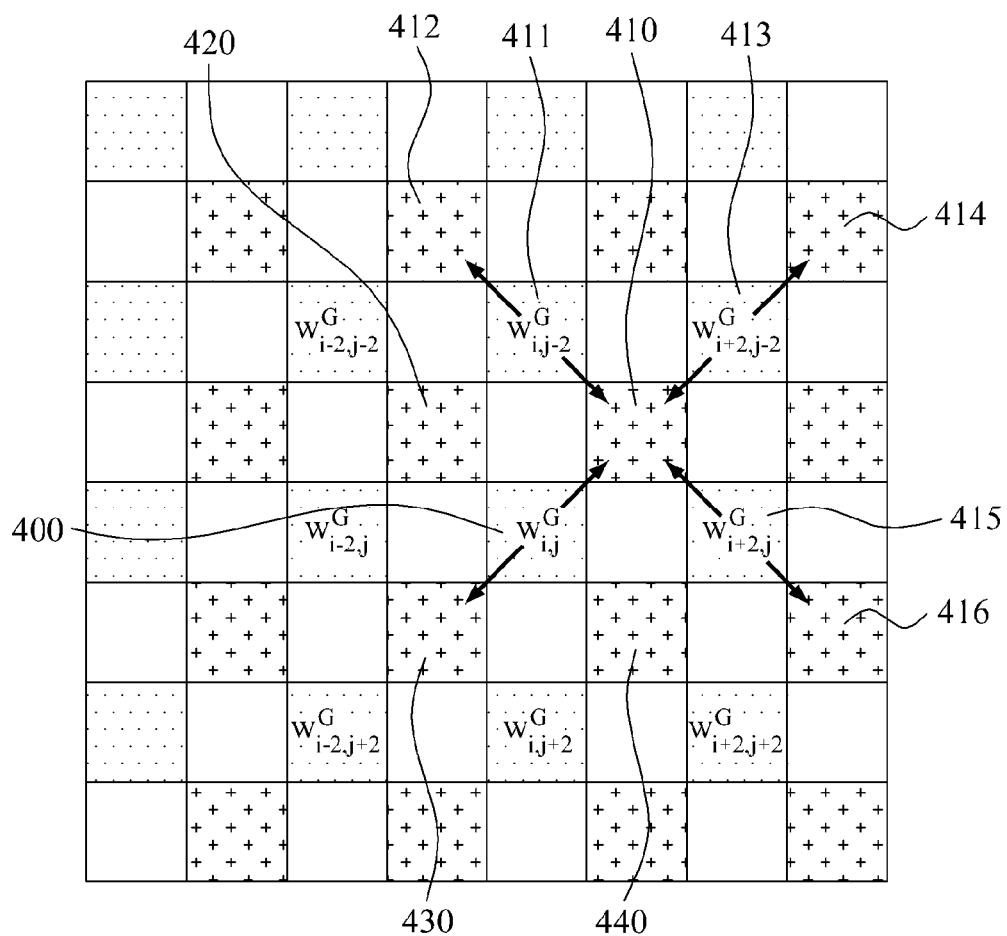
FIG. 4 illustrates a process of determining depth information of a G channel color pixel by the depth information determination unit, according to example embodiments.

FIG. 4 illustrates a process of determining depth information of a G channel color pixel by the depth information determination unit 110, according to example embodiments.

A current color pixel 400 located in a coordinate (i, j) indicates only the G channel. Therefore, the depth information determination unit 110 may use a first peripheral depth pixel 410, a second peripheral depth pixel 420, a third peripheral depth pixel 430, and a fourth peripheral depth pixel 440 which adjoin the current color pixel 400, to determine depth information of the current color pixel 400. However, because the first peripheral depth pixel 410, the second peripheral depth pixel 420, the third peripheral depth pixel 430, and the fourth peripheral depth pixel 440 do not include color information of the G channel, comparison between the first to fourth depth pixels 410 to 440 with the current color pixel 400 may be impractical.

Therefore, the depth information determination unit 110 may generate weights of the peripheral depth pixels using color pixels adjoining the peripheral depth pixels.

In detail, the peripheral color pixel weight determiner 310 may compare G channel color information of a first peripheral color pixel 411, G channel color information of a second peripheral color pixel 413, and G channel color information of a third peripheral color pixel 415 adjoining the first peripheral depth pixel 410, respectively with G channel color information of the current color pixel 400.

Next, the peripheral color pixel weight determiner 310 may determine a weight $W^G_{i,j-2}$ of the first peripheral color pixel 411, a weight $W^G_{i+2,j-2}$ of the second peripheral color pixel 413, and a weight $W^G_{i+2,j}$ of the third peripheral color pixel 415. In this instance, the peripheral color pixel weight determiner 310 may also determine a weight $W^G_{i,j}$ of the current color pixel 400.

Next, the peripheral depth pixel weight determiner 320 may determine weights of the peripheral depth pixels using the weights of the peripheral color pixels determined by the peripheral color pixel weight determiner 310. For example, the peripheral depth pixel weight determiner 320 may determine a weight $W^D_{i+1,j-1}$ of the first peripheral depth pixel 410 using Equation 1.

$$W^D_{i+1,j-1} = \frac{1}{N} \begin{pmatrix} \frac{1}{|D(i+1,j-1)-D(i+3,j-3)|} W^G_{i+2,j-2} + \\ \frac{1}{|D(i+1,j-1)-D(i-1,j-3)|} W^G_{i,j-2} + \\ \frac{1}{|D(i+1,j-1)-D(i-1,j+1)|} W^G_{i,j} + \\ \frac{1}{|D(i+1,j-1)-D(i+3,j+1)|} W^G_{i+2,j} \end{pmatrix} \quad \text{Equation 1}$$

Here, N may denote a normalization constant for controlling a sum of weights to be 1, and D(i+1, j−1) may denote depth information of the first peripheral depth pixel 410.

D(i−1, j−3) may denote depth information of a first symmetrical depth pixel 412 symmetrical to the first peripheral depth pixel 410 with respect to the first peripheral color pixel 411.

D(i+3, j−3) may denote depth information of a second symmetrical depth pixel 414 symmetrical to the first peripheral depth pixel 410 with respect to the second peripheral color pixel 413.

In addition, D(i−1, j+1) may denote depth information of a depth pixel symmetrical to the first peripheral depth pixel 410 with respect to the current color pixel 400. In this case, the depth pixel may be the third peripheral depth pixel 430.

D(i+3, j+1) may denote depth information of a third symmetrical depth pixel 416 symmetrical to the first peripheral depth pixel 410 with respect to the third peripheral color pixel 415.

According to Equation 1, as a difference between depth pixels symmetrical to the first peripheral depth pixel 410 is smaller, the weights of the peripheral color pixels may more highly influence the weight of the first peripheral depth pixel 410.

Next, the peripheral color pixel weight determiner 310 and the peripheral depth pixel weight determiner 320 may determine a weight $W^D_{i-1,j-1}$ of the second peripheral depth pixel 420, a weight $W^D_{i-1,j+1}$ of the third peripheral depth pixel 420, and a weight $W^D_{i+1,j+1}$ of the fourth peripheral depth pixel 440, by repeating the foregoing process with respect to the second peripheral depth pixel 420, the third peripheral depth pixel 430, and the fourth peripheral depth pixel 440.

Last, the color pixel depth information determiner 330 may determine depth information of the current color pixel by applying the weights of the peripheral depth pixels to the depth information of the peripheral depth pixels. For example, the color pixel depth information determiner 330 may determine the depth information of the current color pixel using Equation 2.

$$D(i,j) = \frac{1}{N} \sum_{(m,n) \in \Omega} W^D_{m,n} D(m,n) \quad \text{Equation 2}$$

Here, Ω may include coordinates of the peripheral depth pixels used for determining the depth information of the current color pixel 400. That is, Ω may include coordinates of the first peripheral depth pixel 410, the second peripheral depth pixel 420, the third peripheral depth pixel 430, and the fourth peripheral depth pixel 440.

Figure 5:
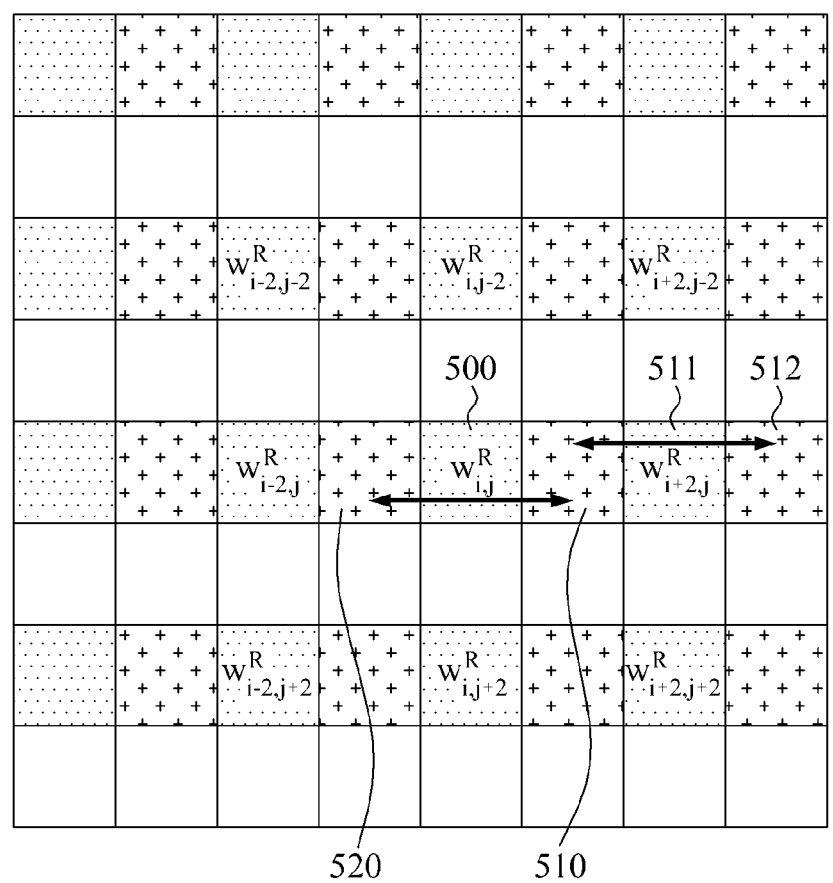
FIG. 5 illustrates a process of determining depth information of an R channel color pixel by the depth information determination unit, according to example embodiments.

FIG. 5 illustrates a process of determining depth information of an R channel color pixel by the depth information determination unit 110, according to example embodiments.

A current color pixel 500 located in a coordinate (i, j) indicates only the R channel. Therefore, the depth information determination unit 110 may use a first peripheral depth pixel 510 adjoining a right side of the current color pixel 500 and a second peripheral depth pixel 520 adjoining a left side of the current color pixel 500, to determine depth information of the current color pixel 500.

In detail, the peripheral color pixel weight determiner 310 may determine a weight $W^R_{i+2,j}$ of a first peripheral color pixel 511 adjoining the first peripheral depth pixel 510, by comparing R channel color information of the first peripheral color pixel 511 with R channel color information of the current color pixel 500. Here, a weight $W^R_{i,j}$ of the current color pixel 500 may also be determined by the peripheral color pixel weight determiner 310.

Next, the peripheral depth pixel weight determiner 320 may determine weights of the peripheral depth pixels using the weights of the peripheral color pixels determined by the peripheral color pixel weight determiner 310. The peripheral depth pixel weight determiner 320 may determine a weight $W^D_{i+1,j}$ of the first peripheral depth pixel 510 using Equation 3.

$$W^D_{i+1,j} = \frac{1}{N} \left( \frac{1}{|D(i+1,j)-D(i+3,j)|} W^R_{i+2,j} + \frac{1}{|D(i+1,j)-D(i-1,j)|} W^R_{i-2,j} \right) \quad \text{Equation 3}$$

Here, D(i+1, j) may denote depth information of the first peripheral depth pixel 510. D(i+3, j) may denote depth information of a first symmetrical depth pixel 512 symmetrical to the first peripheral depth pixel 510 with respect to the first peripheral color pixel 511.

D(i−1, j) may denote depth information of a depth pixel symmetrical to the first peripheral depth pixel 510 with respect to the current color pixel 500. In this case, the depth pixel may be the second peripheral depth pixel 520.

Next, the peripheral color pixel weight determiner 310 and the peripheral depth pixel weight determiner 320 may determine a weight $W^D_{i-1, j}$ of the second peripheral depth pixel 520 by repeating the foregoing process with respect to the second peripheral depth pixel 520.

Last, the color pixel depth information determiner 330 may determine depth information of the current color pixel by applying the weights of the peripheral depth pixels to the depth information of the peripheral depth pixels. For example, the color pixel depth information determiner 330 may determine the depth information of the current color pixel using Equation 2.

Figure 6:
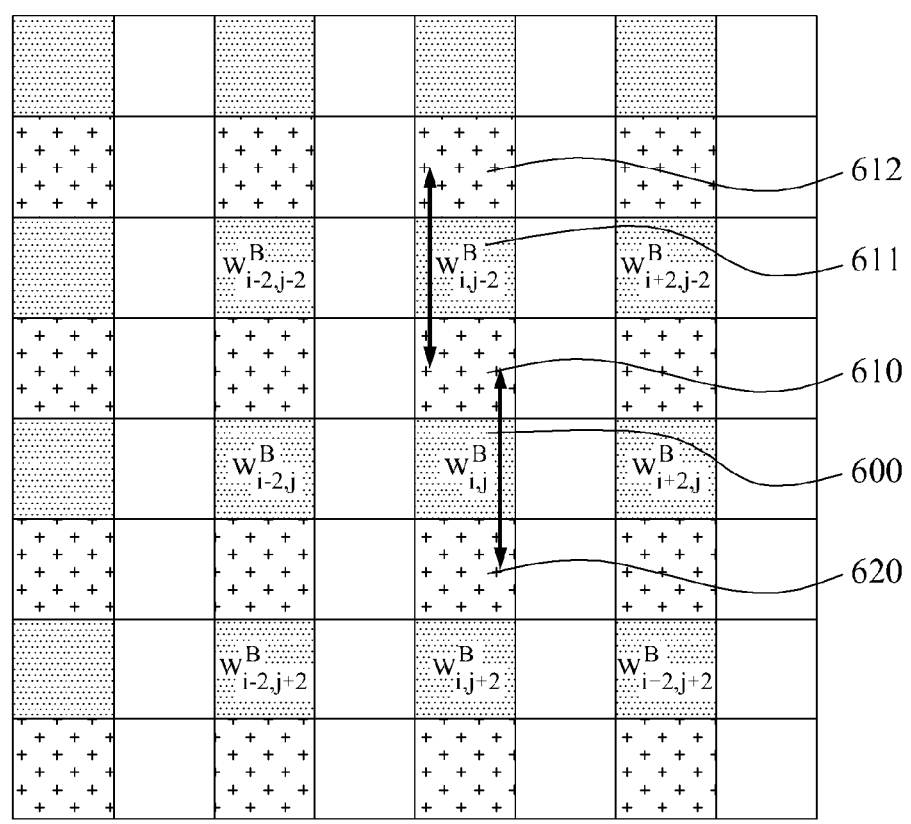
FIG. 6 illustrates a process of determining depth information of a B channel color pixel by the depth information determination unit, according to example embodiments.

FIG. 6 illustrates a process of determining depth information of a B channel color pixel by the depth information determination unit 110, according to example embodiments.

The current color pixel 600 located in the coordinate (i, j) indicates only the B channel. Therefore, the depth information determination unit 110 may use a first peripheral depth pixel 610 adjoining an upper side of the current color pixel 600 and a second peripheral depth pixel 620 adjoining a lower side of the current color pixel 600, to determine depth information of the current color pixel 600.

In detail, the peripheral color pixel weight determiner 310 may determine a weight $W^B_{i, j-2}$ of a first peripheral color pixel 611 adjoining the first peripheral depth pixel 610, by comparing B channel color information of the first peripheral color pixel 611 with B channel color information of the current color pixel 600. Here, a weight $W^B_{i, j}$ of the current color pixel 600 may also be determined by the peripheral color pixel weight determiner 310.

Next, the peripheral depth pixel weight determiner 320 may determine weights of the peripheral depth pixels using the weights of the peripheral color pixels determined by the peripheral color pixel weight determiner 310. For example, the peripheral depth pixel weight determiner 320 may determine a weight $W^D_{i, j-1}$ of the first peripheral depth pixel 610 using Equation 4.

$$W^D_{i,j-1} = \frac{1}{N}\left( \frac{1}{|D(i, j-1) - D(i, j-3)|} W^B_{i,j-2} + \frac{1}{|D(i, j-1) - D(i, j+1)|} W^B_{i,j} \right) \quad \text{Equation 4}$$

Here, D(i, j−1) may denote depth information of the first peripheral depth pixel 610. D(i, j−3) may denote depth information of a first symmetrical depth pixel 612 symmetrical to the first peripheral depth pixel 610 with respect to the first peripheral color pixel 611.

D(i, j+1) may denote depth information of a depth pixel symmetrical to the first peripheral depth pixel 610 with respect to the current color pixel 600. In this case, the depth pixel may be the second peripheral depth pixel 620.

Next, the peripheral color pixel weight determiner 310 and the peripheral depth pixel weight determiner 320 may determine a weight $W^D_{i, +1}$ of the second peripheral depth pixel 620 by repeating the foregoing process with respect to the second peripheral depth pixel 620.

Last, the color pixel depth information determiner 330 may determine depth information of the current color pixel by applying the weights of the peripheral depth pixels to the depth information of the peripheral depth pixels. For example, the color pixel depth information determiner 330 may determine the depth information of the current color pixel using Equation 2.

Figure 7:
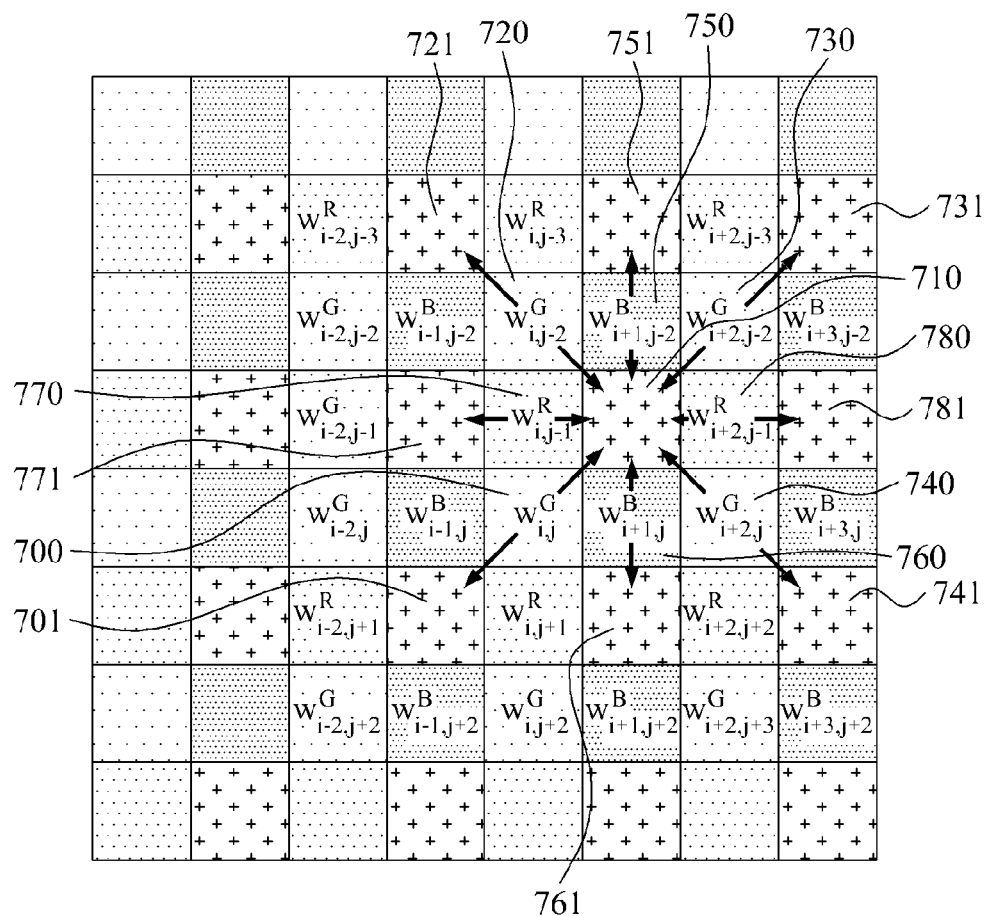
FIG. 7 illustrates a process of determining a weight of a depth pixel using all of red, green, and blue (RGB) channel color pixels according to example embodiments.

FIG. 7 illustrates a process of determining a weight of a depth pixel using all RGB channel color pixels, according to example embodiments.

The peripheral color pixel weight determiner 310 may compare G channel color information of a first peripheral color pixel 720, G channel color information of a second peripheral color pixel 730, and G channel color information of a third peripheral color pixel 740 adjoining the first peripheral depth pixel 710, respectively with G channel color information of a current color pixel 700.

Next, the peripheral color pixel weight determiner 310 may determine a weight $W^G_{i, j-2}$ of the first peripheral color pixel 720, a weight $W^G_{i+2, j-2}$ of the second peripheral color pixel 730, and a weight $W^G_{i+2, j}$ of the third peripheral color pixel 740, according to the comparison result. Here, the peripheral color pixel weight determiner 310 may also determine a weight $W^G_{i, j}$ of the current color pixel 700.

In addition, the peripheral color pixel weight determiner 310 may determine a weight $W^B_{i+1, j-2}$ of a fourth peripheral color pixel 750 and a weight $W^B_{i+1, j}$ of a fifth peripheral color pixel 760, the fourth peripheral color pixel 750 and the fifth peripheral color pixel 760 adjoining the first peripheral depth pixel 710, by comparing B channel color information of the fourth peripheral color pixel 750 with B channel color information of the fifth peripheral color pixel 760. Here, the peripheral color pixel weight determiner 310 may also determine a weight $W^B_{i+1, j}$ of the fifth peripheral color pixel 760, the first peripheral depth pixel 710 and the third peripheral color pixel 740 adjoining the current color pixel 700 by using G channel color information of the first peripheral depth pixel 710 and G channel color information of the third peripheral color pixel 740.

In addition, the peripheral color pixel weight determiner 310 may determine a weight $W^R_{i, j-1}$ of a sixth peripheral color pixel 770 and a weight $W^R_{i+2, j-1}$ of a seventh peripheral color pixel 780, the sixth peripheral color pixel 770 and the seventh peripheral color pixel 780 adjoining the first peripheral depth pixel 710, by comparing R channel color information of the sixth peripheral color pixel 770 with R channel color information of the seventh peripheral color pixel 780.

Next, the peripheral depth pixel weight determiner 320 may determine weights of the peripheral depth pixels using the weights of the peripheral color pixels determined by the peripheral color pixel weight determiner 310. For example, the peripheral depth pixel weight determiner 320 may determine a weight $W^D_{i+1, j-1}$ of the first peripheral depth pixel 710 using Equation 5.

$$W^D_{i+1,j-1} = \frac{1}{N}\left\{ \begin{array}{l} \dfrac{1}{|D(i+1, j-1) - D(i+3, j-3)|} W^G_{i+2,j-2} + \\[4pt] \dfrac{1}{|D(i+1, j-1) - D(i-1, j-3)|} W^G_{i,j-2} + \\[4pt] \dfrac{1}{|D(i+1, j-1) - D(i-1, j+1)|} W^G_{i,j} + \\[4pt] \dfrac{1}{|D(i+1, j-1) - D(i+3, j+1)|} W^G_{i+2,j} + \\[4pt] \dfrac{1}{|D(i+1, j) - D(i+3, j)|} W^R_{i+2,j} + \\[4pt] \dfrac{1}{|D(i+1, j) - D(i-1, j)|} W^R_{i-2,j} + \\[4pt] \dfrac{1}{|D(i, j-1) - D(i, j-3)|} W^B_{i,j-2} + \\[4pt] \dfrac{1}{|D(i, j-1) - D(i, j+1)|} W^B_{i,j} \end{array} \right\} \quad \text{Equation 5}$$

Here, D(i+1, j−1) may denote depth information of the first peripheral depth pixel 710. D(i−1, j−3) may denote depth information of a first symmetrical depth pixel 721 with respect to the first peripheral color pixel 720. D(i+3, j−3) may denote depth information of a second symmetrical depth pixel 731 symmetrical to the first peripheral depth pixel 710 with respect to the second peripheral color pixel 730.

D(i−1, j+1) may denote depth information of a depth pixel symmetrical to the first peripheral depth pixel 710 with respect to the current color pixel 700. In this case, the depth pixel may be the third peripheral depth pixel 701. D(i+3, j+1) may denote depth information of a third symmetrical depth pixel 741 symmetrical to the first peripheral depth pixel 710 with respect to the third peripheral color pixel 740.

D(i+3, j) may denote depth information of a seventh symmetrical depth pixel 781 symmetrical to the first peripheral depth pixel 710 with respect to the seventh peripheral color pixel 780. D(i−1, j) may denote depth information of a depth pixel symmetrical to the first peripheral depth pixel 710 with respect to the sixth peripheral color pixel 770. In this case, the depth pixel may be a second peripheral depth pixel 771.

Last, D(i, j−3) may denote depth information of a fourth symmetrical depth pixel 751 symmetrical to the first peripheral depth pixel 710 with respect to the fourth peripheral color pixel 750. D(i, j+1) may denote depth information of a depth pixel symmetrical to the first peripheral depth pixel 710 with respect to the fifth peripheral color pixel 760. Here, the depth pixel may be the third peripheral depth pixel 761.

Next, the peripheral color pixel weight determiner 310 and the peripheral depth pixel weight determiner 320 may determine a weight $W^D_{i-1, j-1}$ of the second peripheral depth pixel 771, a weight $W^D_{i-1, j+1}$ of the third peripheral depth pixel 701, and a weight $W^D_{i+1, j+1}$ of the fourth peripheral depth pixel 761, by repeating the foregoing process with respect to the second peripheral depth pixel 771, the third peripheral depth pixel 701, and the fourth peripheral depth pixel 761.

Last, the color pixel depth information determiner 330 may determine depth information of the current color pixel by applying the weights of the peripheral depth pixels to the depth information of the peripheral depth pixels.

Figure 8:
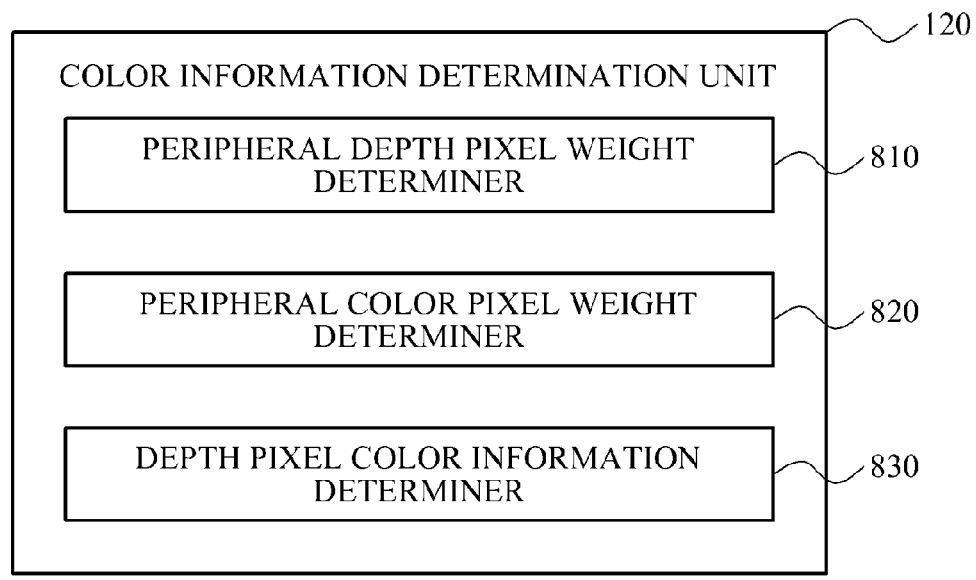
FIG. 8 illustrates configuration of a color information determination unit according to example embodiments.

FIG. 8 illustrates configuration of a color information determination unit 120 according to example embodiments.

Referring to FIG. 8, the color information determination unit 120 may include a peripheral depth pixel weight determiner 810, a peripheral color pixel weight determiner 820, and a depth pixel color information determiner 830.

The peripheral depth pixel weight determiner 810 may determine weights of peripheral depth pixels. In detail, the peripheral depth pixel weight determiner 810 may compare a pixel value of current depth pixels with pixel values of the peripheral depth pixels, and determine the weights of the peripheral depth pixels according to the comparison result. For example, as a difference in pixel value between the current depth pixel and the peripheral depth pixels is smaller, the weights of the peripheral depth pixels may be determined to be higher.

The peripheral depth pixel weight determiner 810 may determine the weights of the peripheral depth pixels using a filter such as a bilateral filter and a sigma filter, for example.

The peripheral color pixel weight determiner 820 may determine weights of peripheral color pixels using the weights of the peripheral depth pixels determined by the peripheral depth pixel weight determiner 810.

Here, the color information determination unit 120 may determine the weights of the peripheral color pixels with respect to R, G, and B channels.

In detail, the color information determination unit 120 may determine a weight of a G channel peripheral color pixel using peripheral color pixels indicating a G channel and the weights of the peripheral depth pixels determined by the peripheral depth pixel weight determiner 810. In addition, the color information determination unit 120 may determine a weight of an R channel peripheral color pixel using peripheral color pixels indicating an R channel and the weights of the peripheral depth pixels determined by the peripheral depth pixel weight determiner 810. In addition, the color information determination unit 120 may determine a weight of a B channel peripheral color pixel using peripheral color pixels indicating a B channel and the weights of the peripheral depth pixels determined by the peripheral depth pixel weight determiner 810.

The peripheral color pixel weight determiner 820 may determine the weights of the peripheral color pixels using a difference between color information of symmetrical color pixels and color information of peripheral color pixels. Here, the symmetrical color pixels may be color pixels which are symmetrical to peripheral color pixels with respect to the peripheral depth pixels and have a same channel as the peripheral color pixels.

In detail, the peripheral color pixel weight determiner 820 may compensate weights of directions corresponding to the peripheral color pixels to be inversely proportional to the difference between the color information of the symmetrical color pixels and the color information of the peripheral color pixels. Next, the peripheral color pixel weight determiner 820 may determine the weights of the peripheral color pixels by combining the compensated weights.

That is, the peripheral color pixel weight determiner 820 may reflect an edge of the color information indicated by the color pixel to the weights of the peripheral color pixels, by compensating the weights of the peripheral color pixels located between corresponding color pixels according to the difference between the color pixels. For example, the peripheral color pixel weight determiner 820 may increase the weights of the peripheral depth pixels located in a direction of corresponding symmetrical color pixels, according to a decrease in the difference between the symmetrical color pixels and the peripheral color pixels.

The depth pixel color information determiner 830 may determine color information per channel of the current depth pixel by applying the weights of the peripheral color pixels to the color information of the peripheral color pixels. For example, the depth pixel color information determiner 830 may determine R channel color information, by dividing a sum of values obtained by applying weights of the R channel peripheral color pixels to the R channel color information of the R channel peripheral color pixels, by a number of the R channel peripheral color pixels. In addition, the depth pixel color information determiner 830 may determine G channel color information and B channel color information of the current color pixel using the G channel peripheral color pixels and B channel peripheral color pixels.

Here, the depth pixel color information determiner 830 may add the determined color information as the color information of the current depth pixel.

Figure 9:
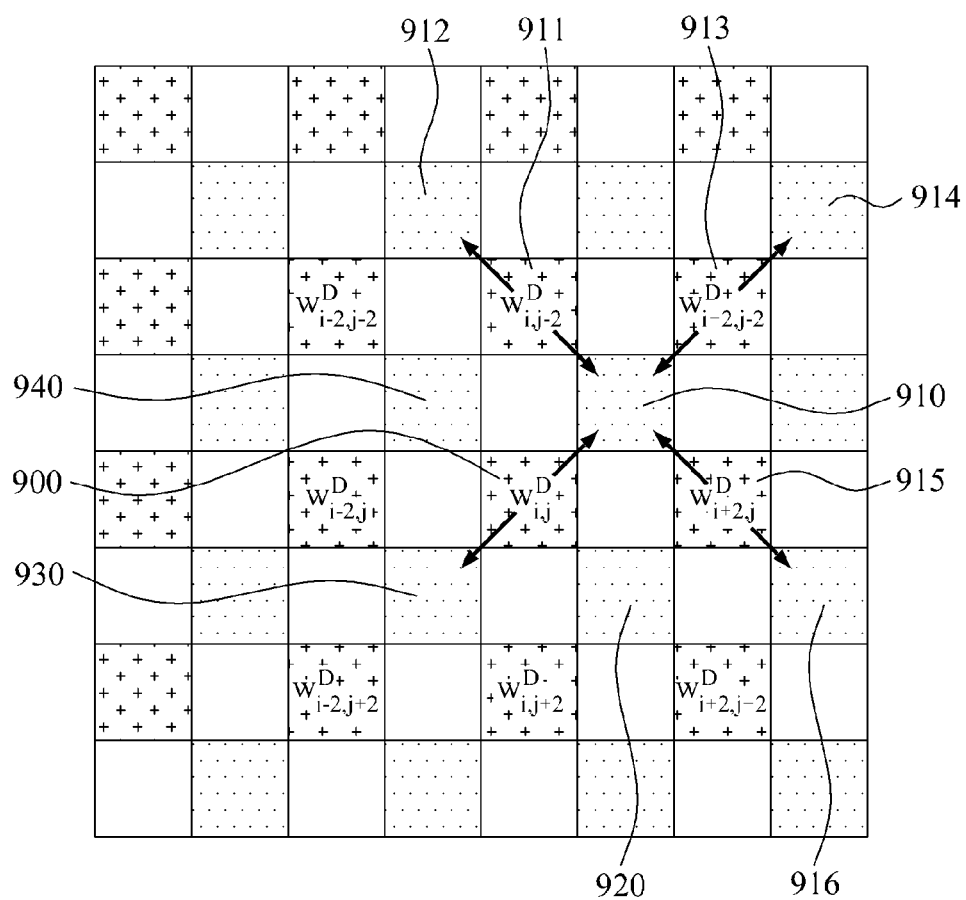
FIG. 9 illustrates a process of determining G channel color information of a depth pixel by the color information determination unit, according to example embodiments.

FIG. 9 illustrates a process of determining the G channel color information of the depth pixels by the color information determination unit 120, according to example embodiments.

A current depth pixel 900 located in a coordinate (i, j) indicates only depth information. Therefore, the color information determination unit 120 may use a first peripheral color pixel 910, a second peripheral color pixel 920, a third peripheral color pixel 930, and a fourth peripheral color pixel 940 which adjoin the current depth pixel 900, to determine G channel color information of the current depth pixel 900. However, because the first peripheral color pixel 910, the second peripheral color pixel 920, the third peripheral color pixel 930, and the fourth peripheral color pixel 940 do not include depth information, comparison between the first to fourth color pixels 910 to 440 with the current depth pixel 900 may be impractical.

Therefore, the color information determination unit 120 may generate weights of the G channel peripheral color pixels using depth pixels adjoining the G channel peripheral color pixels.

In detail, the peripheral depth pixel weight determiner 810 may compare depth information of a first peripheral depth pixel 911, depth information of a second peripheral depth pixel 913, and depth information of a third peripheral depth pixel 915 adjoining the first peripheral color pixel 910, respectively with depth information of the current depth pixel 900.

Next, the peripheral depth pixel weight determiner 810 may determine a weight $W^D_{i, j-2}$ of the first peripheral depth pixel 911, a weight $W^D_{i+2, j-2}$ of the second peripheral depth pixel 913, and a weight $W^D_{i+2, j}$ of the third peripheral depth pixel 915. Here, the peripheral depth pixel weight determiner 810 may also determine a weight $W^D_{i, j}$ of the current depth pixel 900.

Next, the peripheral color pixel weight determiner 820 may determine weights of peripheral color pixels using the weights of the peripheral depth pixels determined by the peripheral depth pixel weight determiner 810. For example, the peripheral color pixel weight determiner 820 may determine a weight $W^G_{i+1, j-1}$ of the first peripheral color pixel 910 using Equation 6.

$$W^G_{i+1, j-1} = \frac{1}{N} \left( \frac{1}{|G(i+1, j-1) - G(i+3, j-3)|} W^D_{i+2, j-2} + \frac{1}{|G(i+1, j-1) - G(i-1, j-3)|} W^D_{i, j-2} + \frac{1}{|G(i+1, j-1) - G(i-1, j+1)|} W^D_{i, j} + \frac{1}{|G(i+1, j-1) - G(i+3, j+1)|} W^D_{i+2, j} \right)$$

Equation 6

Here, G(i+1, j−1) may be G channel color information of the first peripheral color pixel 910. D(i−1, j−3) may be G channel color information of a first symmetrical color pixel 912 symmetrical to the first peripheral color pixel 910 with respect to the first peripheral depth pixel 911. D(i+3, j−3) may be G channel color information of a second symmetrical color pixel 914 symmetrical to the first peripheral color pixel 910 with respect to the second peripheral depth pixel 913.

D(i−1, j+1) may be G channel color information of a color pixel symmetrical to the first peripheral color pixel 910 with respect to the current depth pixel 900. Here, the color pixel may be the third peripheral color pixel 930.

D(i+3, j+1) may be G channel color information of a third symmetrical color pixel 916 symmetrical to the first peripheral color pixel 910 with respect to the third peripheral depth pixel 915.

Next, the peripheral depth pixel weight determiner 810 and the peripheral color pixel weight determiner 820 may determine a weight $W^G_{i-1, j-1}$ of the second peripheral color pixel 920, a weight $W^G_{i-1, j+1}$ of the third peripheral color pixel 930, and a weight $W^G_{i+1, j+1}$ of the fourth peripheral color pixel 940, by repeating the foregoing process with respect to the second peripheral color pixel 920, the third peripheral color pixel 930, and the fourth peripheral color pixel 940.

Last, the depth pixel color information determiner 830 may determine the G channel color information of the current depth pixel, by applying the weights of the peripheral color pixels to the G channel color information of the peripheral color pixels. For example, the depth pixel color information determiner 830 may determine the G channel color information of the current depth pixel using Equation 7.

$$G(i, j) = \frac{i}{N} \sum_{(m,n) \in \Omega} W^G_{m,n} G(m, n)$$

Equation 7

Figure 10:
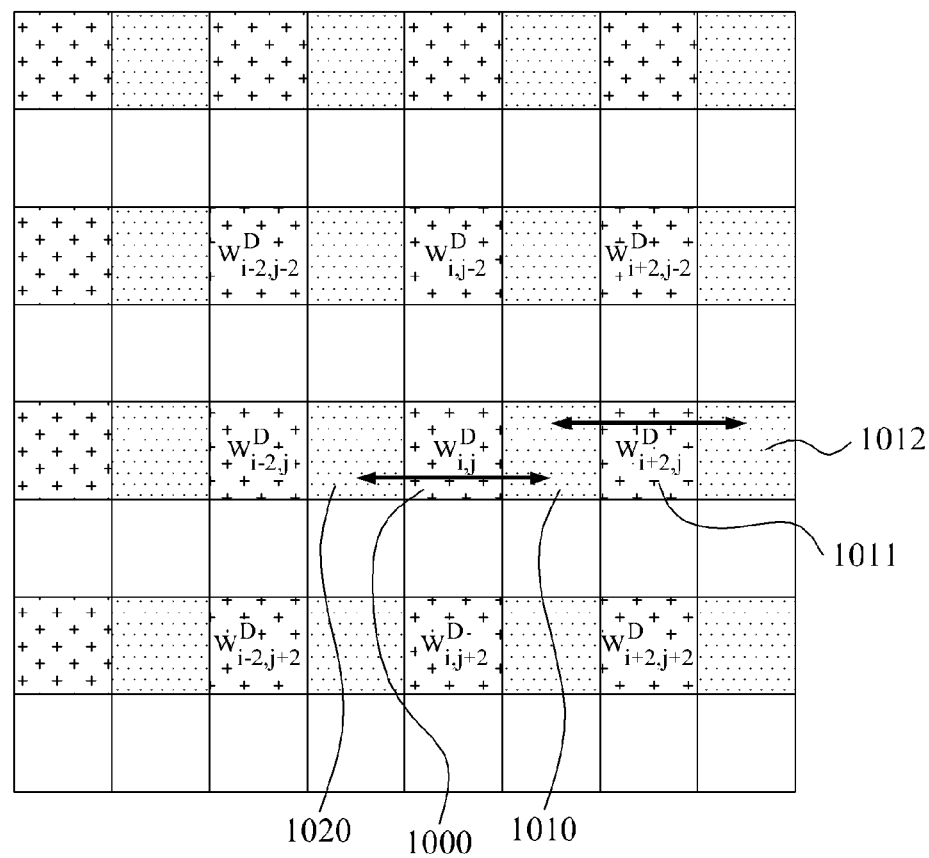
FIG. 10 illustrates a process of determining R channel color information of a depth pixel by the color information determination unit, according to example embodiments.

FIG. 10 illustrates a process of determining R channel color information of a depth pixel by the color information determination unit 120, according to example embodiments.

A current depth pixel 1000 located in a coordinate (i, j) is a depth pixel indicating only depth information. Therefore, the color information determination unit 120 may use a first peripheral color pixel 1010 which is an R channel color pixel adjoining a right side of the current depth pixel 1000 and a second peripheral color pixel 1020 which is an R channel color pixel adjoining a left side of the current color pixel 1000, to determine the R channel color information of the current depth pixel 1000.

In detail, the peripheral depth pixel weight determiner 810 may determine a weight $W^D_{i+2, j}$ of a first peripheral depth pixel 1011 adjoining the first peripheral color pixel 1010, by comparing depth information of the first peripheral depth pixel 1011 with depth information of the current depth pixel 1000. Here, a weight $W^D_{i, j}$ of the current depth pixel 1000 may also be determined by the peripheral depth pixel weight determiner 810.

Next, the peripheral depth pixel weight determiner 820 may determine weights of the peripheral color pixels using the weights of the peripheral depth pixels determined by the peripheral depth pixel weight determiner 810. For example the peripheral color pixel weight determiner 820 may determine a weight $W^R_{i+1, j}$ of the first peripheral color pixel 1010 using Equation 8.

$$W^R_{i+1, j} = \frac{1}{N} \left( \frac{1}{|R(i+1, j) - R(i+3, j)|} W^D_{i+2, j} + \frac{1}{|R(i+1, j) - R(i-1, j)|} W^D_{i-2, j} \right)$$

Equation 8

Here, R(i+1, j) may denote R channel color information of the first peripheral color pixel 1010. R(i+3, j) may denote R channel color information of a first symmetrical color pixel 1012 symmetrical to the first peripheral color pixel 1010 with respect to the first peripheral depth pixel 1011.

R(i−1, j) may denote R channel color information of a color pixel symmetrical to the first peripheral color pixel 1010 with respect to the current depth pixel 1000. Here, the color pixel may be the second peripheral color pixel 1020.

Next, the peripheral depth pixel weight determiner 810 and the peripheral color pixel weight determiner 820 may determine a weight $W^R_{i-1,\,j}$ of the second peripheral color pixel 1020 by repeating the foregoing process with respect to the second peripheral color pixel 1020.

Last, the depth pixel color information determiner 830 may determine R channel color information of the current depth pixel, by applying the weights of the peripheral color pixels to the R channel color information of the peripheral color pixels. For example, the depth pixel color information determiner 830 may determine the R channel color information of the current depth pixel using Equation 9.

$$R(i,\,j) = \frac{i}{N} \sum_{(m,n)\in\Omega} W^R_{m,n} R(m,\,n) \qquad \text{Equation 9}$$

Figure 11:
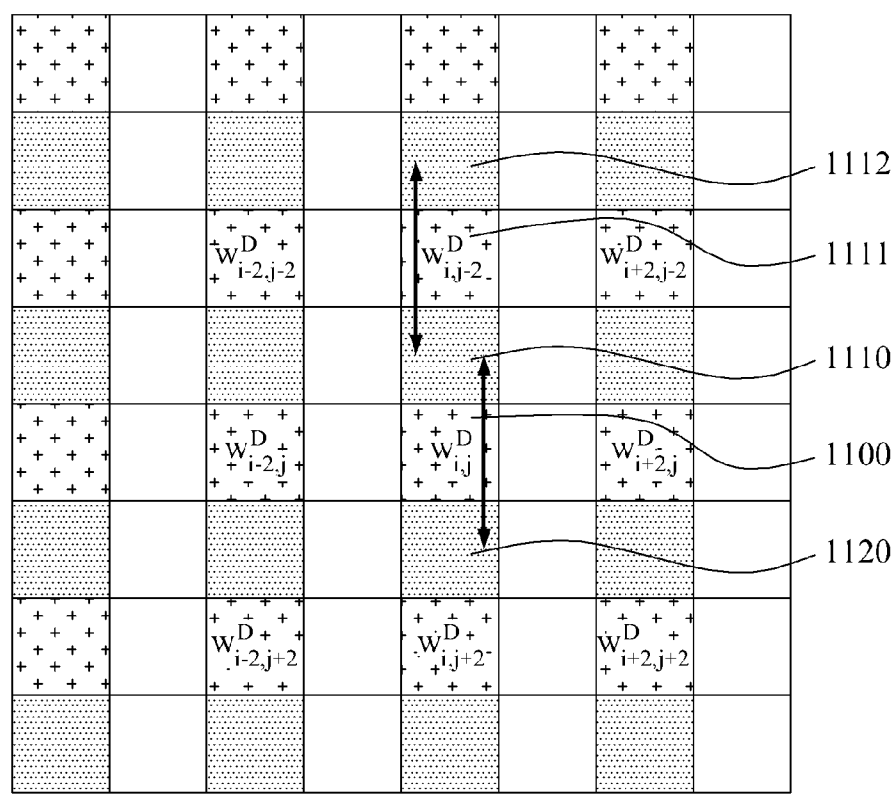
FIG. 11 illustrates a process of determining B channel color information of a depth pixel by the color information determination unit, according to example embodiments.

FIG. 11 illustrates a process of determining B channel color information of a depth pixel by the color information determination unit 120, according to example embodiments.

A current depth pixel 1100 located in a coordinate (i, j) is a depth pixel indicating only depth information. Therefore, the color information determination unit 120 may use a first peripheral color pixel 1110 which is a B channel color pixel adjoining an upper side of the current depth pixel 1100 and a second peripheral color pixel 1120 which is a B channel color pixel adjoining a lower side of the current color pixel 1100, to determine the B channel color information of the current depth pixel 1100.

In detail, the peripheral depth pixel weight determiner 810 may determine a weight $W^D_{i,\,j-1}$ of a first peripheral depth pixel 1111 adjoining the first peripheral color pixel 1110, by comparing depth information of the first peripheral depth pixel 1111 with depth information of the current depth pixel 1100. Here, a weight $W^D_{i,\,j}$ of the current depth pixel 1100 may also be determined by the peripheral depth pixel weight determiner 810.

Next, the peripheral color pixel weight determiner 820 may determine weights of peripheral color pixels using the weights of the peripheral depth pixels determined by the peripheral depth pixel weight determiner 810. For example, the peripheral color pixel weight determiner 820 may determine a weight $W^B_{i,\,j-1}$ of the first peripheral color pixel 1110 using Equation 10.

$$W^B_{i,\,j-1} = \frac{1}{N}\left(\frac{1}{|B(i,\,j-1)-B(i,\,j-3)|}W^D_{i,\,j-2} + \frac{1}{|B(i,\,j-1)-B(i,\,j+1)|}W^D_{i,\,j}\right) \qquad \text{Equation 10}$$

Here, B(i, j−1) may denote B channel color information of the first peripheral color pixel 1110. R(i, j−3) may denote B channel color information of a second symmetrical color pixel 1112 symmetrical to the first peripheral color pixel 1110 with respect to the first peripheral depth pixel 1111.

B(i, j+1) may denote B channel color information of a color pixel symmetrical to the first peripheral color pixel 1110 with respect to the current depth pixel 1100. Here, the color pixel may be the second peripheral color pixel 1120.

Next, the peripheral color pixel weight determiner 810 and the peripheral color pixel weight determiner 820 may determine a weight $W^B_{i,\,j+1}$ of the second peripheral color pixel 1120 by repeating the foregoing process with respect to the second peripheral color pixel 1120.

Last, the depth pixel color information determiner 830 may determine B channel color information of the current depth pixel, by applying the weights of the peripheral color pixels to the B channel color information of the peripheral color pixels. For example, the depth pixel color information determiner 830 may determine the B channel color information of the current depth pixel using Equation 11.

$$B(i,\,j) = \frac{i}{N} \sum_{(m,n)\in\Omega} W^B_{m,n} B(m,\,n) \qquad \text{Equation 11}$$

Figure 12:
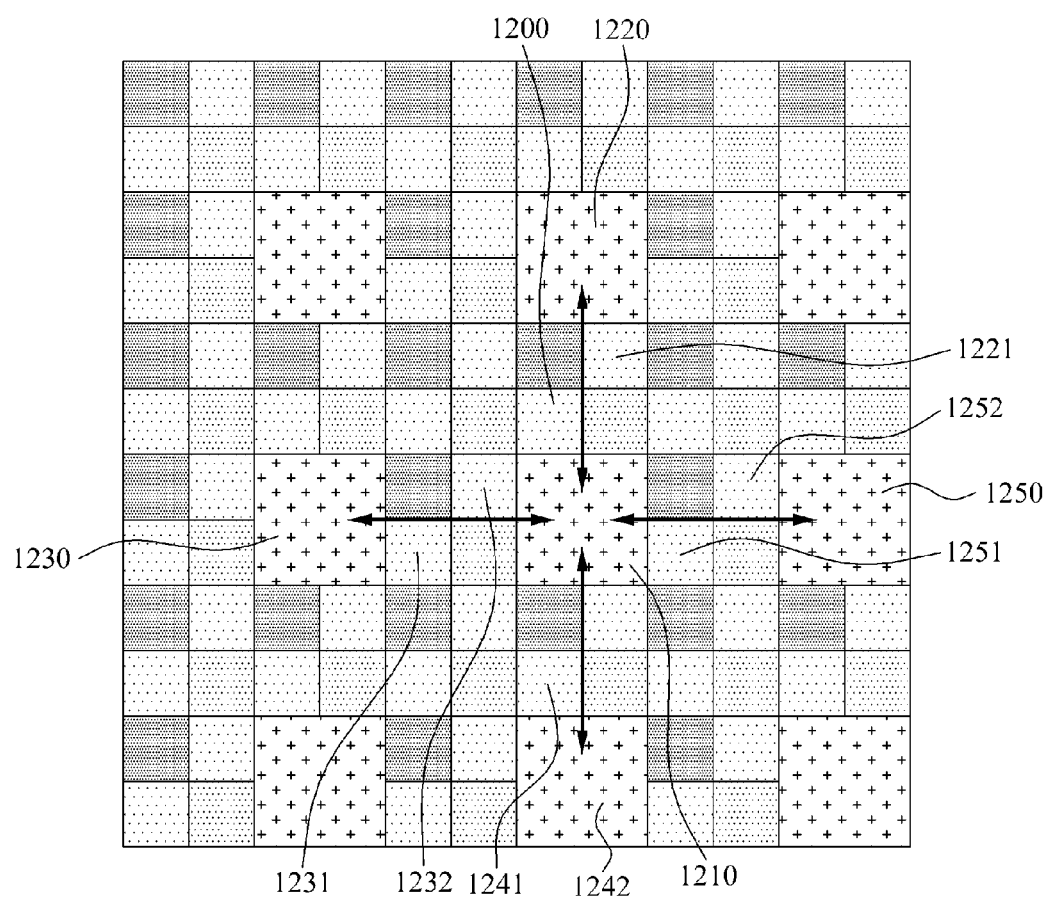
FIG. 12 illustrates a process of determining depth information of a G channel color pixel by the depth information determination unit, according to example embodiments.

FIG. 12 illustrates a process of determining depth information of a G channel color pixel by the depth information determination unit 110, according to example embodiments.

In the embodiments of FIG. 12, the depth information determination unit 110 determines the depth information of the G channel color pixel when a depth pixel and a color pixel of an input image are in different sizes from each other as in Case 2 of FIG. 2.

The depth information determination unit 110 may use a first peripheral depth pixel 1210 and a second peripheral depth pixel 1220 adjoining a current color pixel 1200, to determine depth information of the current color pixel 1200 located in a coordinate (i, j).

Here, the depth information determination unit 110 may generate weights of peripheral depth pixels using color pixels adjoining the peripheral depth pixels.

In detail, the peripheral color pixel weight determiner 310 may compare G channel color information of a first peripheral color pixel 1221, G channel color information of a second peripheral color pixel 1231, and G channel color information of a third peripheral color pixel 1232, G channel color information of a fourth peripheral color pixel 1241, G channel color information of a fifth peripheral color pixel 1242, G channel color information of a sixth peripheral color pixel 1251, and G channel color information of a seventh peripheral color pixel 1252, the first to seventh peripheral color pixels adjoining the first peripheral depth pixel 1210, respectively with G channel color information of the current color pixel 1200.

Next, the peripheral color pixel weight determiner 310 may determine a weight $W^G_{i+1,\,j-1}$ of the first peripheral color pixel 1221, a weight $W^G_{i+1,\,j+2}$ of the second peripheral color pixel 1232, a weight $W^G_{i+1,\,j+14}$ of the third peripheral color pixel 1232, a weight $W^G_{i,\,j+4}$ of the fourth peripheral color pixel 1241, a weight $W^G_{i+1,\,j+3}$ of the fifth peripheral color pixel 1242, a weight $W^G_{i+2,\,j+2}$ of the sixth peripheral color pixel 1251, and a weight $W^G_{i+3,\,j+1}$ of the seventh peripheral color pixel 1252. In this instance, the peripheral color pixel weight determiner 310 may also determine a weight $W^G_{i,\,j}$ of the current color pixel 1200.

Next, the peripheral depth pixel weight determiner 320 may determine weights of the peripheral depth pixels using the weights of the peripheral color pixels determined by the peripheral color pixel weight determiner 310.

Here, the peripheral depth pixel weight determiner 320 may increase or decrease a weight $W^G_{i,\,j}$ of the current color pixel 1200 and a weight $W^G_{i+1,\,j-1}$ of the first peripheral color pixel 1221, according to a difference between depth information of the first peripheral depth pixel 1210 and depth information of the second peripheral depth pixel 1220 which is symmetrical to the first peripheral depth pixel 1210 with respect to the current color pixel 1200 and the first peripheral color pixel 1221. For example, when the difference between the depth information of the first peripheral depth pixel 1210 and the depth information of the second peripheral depth pixel 1220 is relatively large, the peripheral depth pixel weight determiner 320 may decrease a weight $W^G_{i,j}$ of the current color pixel 1200 and a weight $W^G_{i+1,j-1}$ of the first peripheral color pixel 1221. Conversely, when the difference is relatively small, the peripheral depth pixel weight determiner 320 may increase the weight $W^G_{i,j}$ of the current color pixel 1200 and the weight $W^G_{i+1,j-1}$ of the first peripheral color pixel 1221.

In addition, the peripheral depth pixel weight determiner 320 may increase or decrease a weight $W^G_{i+1,j+2}$ of the second peripheral color pixel 1231 and a weight $W^G_{i+1,j+1}$ of the third peripheral color pixel 1232, according to a difference between depth information of the first peripheral depth pixel 1210 and depth information of a first symmetrical depth pixel 1230 symmetrical to the third peripheral color pixel 1231 and the third peripheral color pixel 1232.

Also, the peripheral depth pixel weight determiner 320 may increase or decrease a weight $W^G_{i,j+4}$ of the fourth peripheral color pixel 1241 and a weight $W^G_{i+1,j+3}$ of the fifth peripheral color pixel 1242, according to a difference between depth information of the first peripheral depth pixel 1210 and depth information of a second symmetrical depth pixel 1240 symmetrical to the first peripheral depth pixel 1210 with respect to the fourth peripheral color pixel 1241 and the fifth peripheral color pixel 1242.

Furthermore, the peripheral depth pixel weight determiner 320 may increase or decrease a weight $W^G_{i+2,j-2}$ of the sixth peripheral color pixel 1251 and a weight $W^G_{i+3,j+1}$ of the seventh peripheral color pixel 1252, according to a difference between depth information of the first peripheral depth pixel 1210 and depth information of a third symmetrical depth pixel 1250 symmetrical to the first peripheral depth pixel 1210 with respect to the sixth peripheral color pixel 1251 and the seventh peripheral color pixel 1252.

Last, the color pixel depth determination unit 330 may determine the depth information of the current color pixel by applying the weights of the peripheral depth pixels to the depth information of the peripheral depth pixels.

Figure 13:
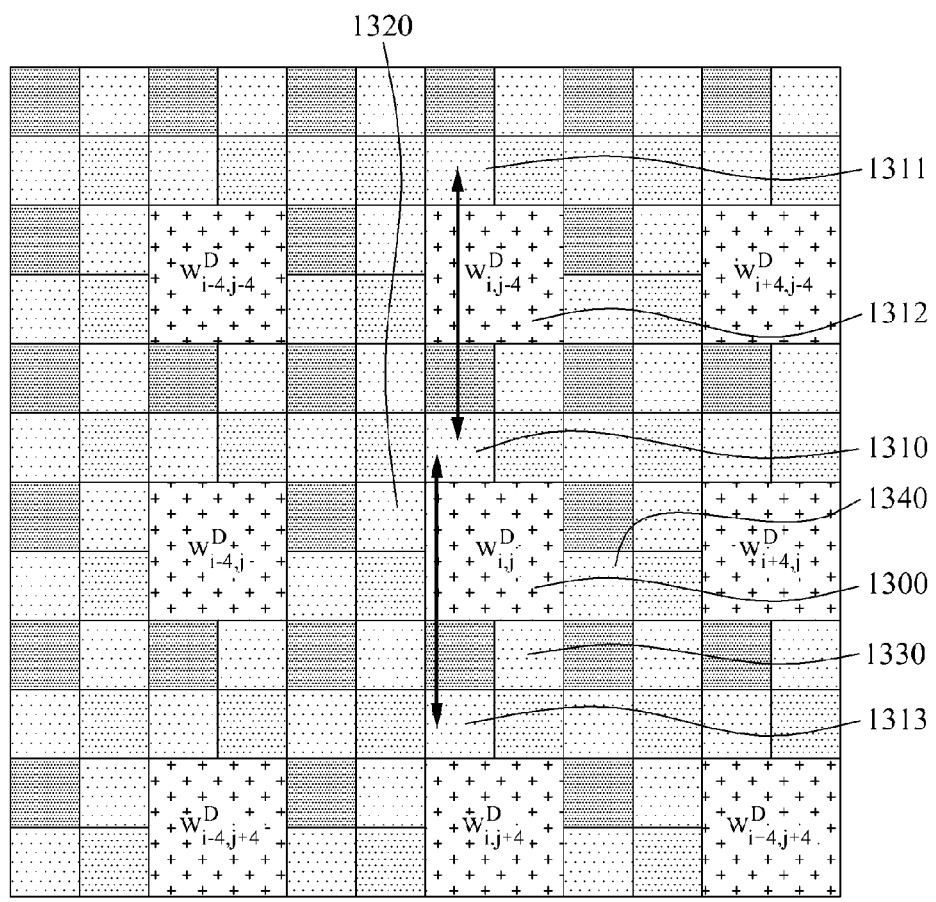
FIG. 13 illustrates a process of determining G channel color information of a depth pixel by the color information determination unit, according to example embodiments.

FIG. 13 illustrates a process of determining G channel color information of a depth pixel by the color information determination unit 120, according to example embodiments.

In the embodiments of FIG. 13, the color information determination unit 120 determines G channel color information of the depth pixel when the depth pixel and a color pixel of an input image are in different sizes from each other as in Case 2 of FIG. 2.

The color information determination unit 120 may use a first peripheral color pixel 1310, a second peripheral color pixel 1320, a third peripheral color pixel 1330, and a fourth peripheral color pixel 1340, which are color pixels of a G channel adjoining a current depth pixel 1300, to determine the G channel color information of the current depth pixel 1300 located in a coordinate (i, j). Here, the depth information determination unit 110 may generate weights of the peripheral depth pixels using the color pixels adjoining the peripheral depth pixels.

In detail, the peripheral color pixel weight determiner 810 may determine a weight $W^D_{i,j-4}$ of the first peripheral depth pixel 1312 by comparing depth information of the first peripheral depth pixel 1312 adjoining the first peripheral color pixel 1310 with depth information of the current depth pixel 1300. Here, a weight $W^D_{i,j}$ of the current depth pixel 1300 may also be determined by the peripheral color pixel weight determiner 810.

Next, the peripheral color pixel weight determiner 820 may determine weights of peripheral color pixels using the weights of the peripheral depth pixels determined by the peripheral depth pixel weight determiner 810.

Here, the peripheral color pixel weight determiner 820 may increase or decrease a weight $W^D_{i,j-4}$ of the first peripheral color pixel 1312 according to a difference between G channel color information of the first peripheral color pixel 1310 and G channel color information of a first symmetrical color pixel 1311 symmetrical to the first peripheral color pixel 1310 with respect to the first peripheral depth pixel 1312.

For example, when the difference in G channel color information between the first peripheral color pixel 1310 and the first symmetrical color pixel 1311 is relatively large, the peripheral color pixel weight determiner 820 may decrease the weight $W^D_{i,j-4}$ of the first peripheral color pixel 1312. When the difference is relatively small, the peripheral color pixel weight determiner 820 may increase the weight $W^D_{i,j-4}$ of the first peripheral color pixel 1312.

Furthermore, the peripheral color pixel weight determiner 820 may increase or decrease the weight $W^D_{i,j}$ of the current depth pixel 1300 according to a difference between the G channel color information of the first peripheral color pixel 1310 and a second symmetrical color pixel 1313 symmetrical to the first peripheral color pixel 1310 with respect to the current depth pixel 1300.

Last, the color pixel depth information determiner 330 may determine depth information of the current color pixel by applying the weights of the peripheral depth pixels to depth information of the peripheral depth pixels.

Figure 14:
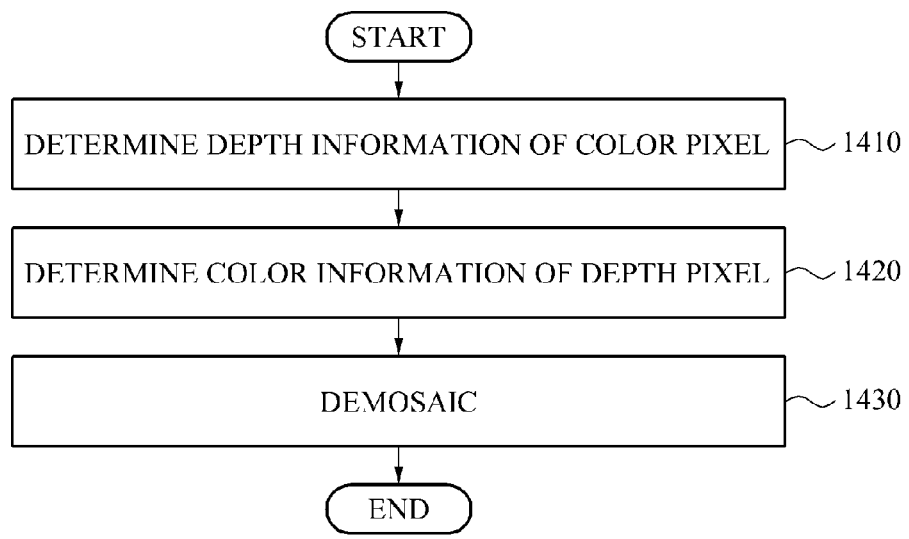
FIG. 14 illustrates an image processing method according to example embodiments.

FIG. 14 illustrates an image processing method according to example embodiments.

In operation 1410, the depth information determination unit 110 may determine depth information of a current color pixel using peripheral color pixels of the current color pixel and peripheral depth pixels of the current color pixel.

In detail, the depth information determination unit 110 may estimate relationship between the peripheral depth pixels and the current color pixel using the peripheral color pixels of the current color pixel. Next, the depth information determination unit 110 may determine the depth information corresponding to the current color pixel based on the relationship and the depth information of the peripheral depth pixels, and add the determined depth information as the depth information of the current color pixel.

In operation 1420, the color information determination unit 120 may determine color information of a current depth pixel using peripheral color pixels of the current color pixel and peripheral depth pixels of the current color pixel.

In detail, the color information determination unit 120 may estimate relationship between the peripheral color pixels and the current depth pixel, using the peripheral depth pixels of the current depth pixel. Next, the color information determination unit 120 may determine color information corresponding to the current depth pixel based on the relationship and color information of the peripheral color pixels, and add the determined color information as the color information of the current depth pixel.

Here, operation 1410 and operation 1420 may be performed simultaneously or in parallel. Operation 1420 may precede operation 1410.

In operation 1430, the color demosaicing unit 130 may perform a color demosaicing process with respect to color pixels of an input image. In detail, when the color demosaicing unit 130 may add color information of a G channel and color information of a B channel to a first color pixel indicating an R channel among the color pixels, so that the first color pixel includes all of color information of the R channel, the color information of the G channel, and the color information of the B channel.

Figure 15:
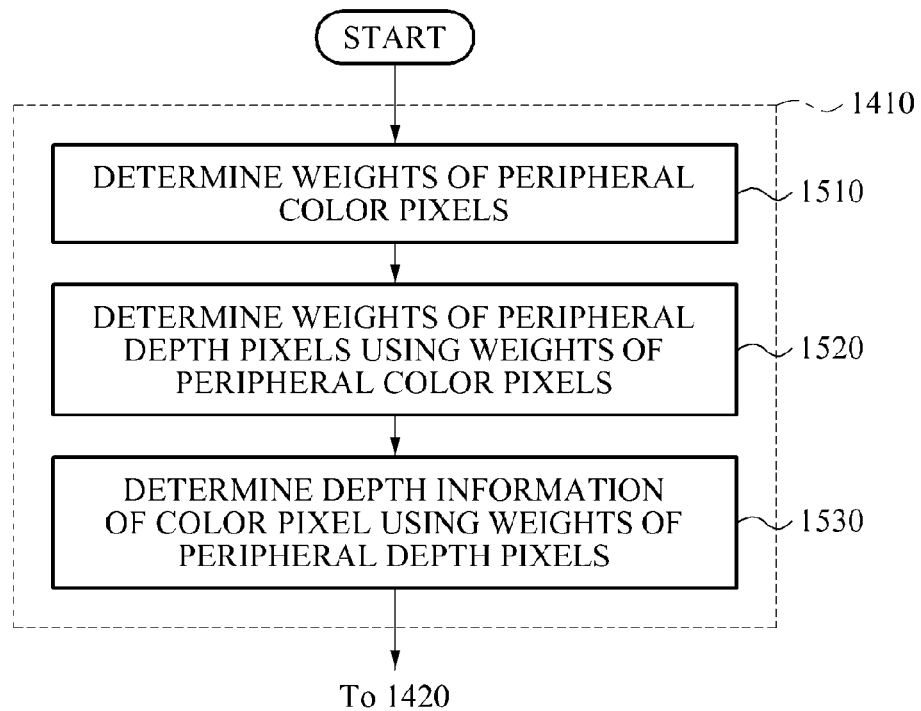
FIG. 15 illustrates a process of determining depth information of color pixels, according to example embodiments.

FIG. 15 illustrates a process of determining depth information of color pixels, according to example embodiments. Operations 1510 to 1530 of FIG. 15 may be included in operation 1410 of FIG. 14.

In operation 1510, the peripheral color pixel weight determiner 310 may determine weights of peripheral color pixels indicating a same channel as a current color pixel.

In detail, the peripheral color pixel weight determiner 310 may compare a pixel value of the current color pixel to pixel values of the peripheral color pixels, and determine the weights of the peripheral color pixels according to the comparison result. For example, as a difference in pixel value between the current color pixel and the peripheral color pixels is smaller, the weights of the peripheral color pixels may be determined to be higher.

In operation 1520, the peripheral depth pixel weight determiner 320 may determine weights of peripheral depth pixels using the weights of the peripheral color pixels determined in operation 1510. In detail, the color pixel depth pixel weight determiner 320 may determine the weights of the peripheral depth pixels, by combining all the weights of the peripheral color pixels determined by the peripheral color pixel weight determiner 310.

Here, the peripheral depth pixel weight determiner 320 may determine the weights of the peripheral depth pixels, using a difference between depth information of symmetrical depth pixels and depth information of the peripheral depth pixels. The symmetrical depth pixels may refer to depth pixels symmetrical to the peripheral depth pixels with respect to the peripheral color pixels.

For example, the peripheral depth pixel weight determiner 320 may compensate weights of directions corresponding to the peripheral color pixels to be inversely proportional to the difference between the depth information of the symmetrical depth pixels and the depth information of the peripheral depth pixels. Next, the peripheral depth pixel weight determiner 320 may determine the weights of the peripheral depth pixels by combining the compensated weights.

In operation 1530, the color pixel depth information determiner 330 may determine the depth information of the current color pixel by applying the weights of the peripheral depth pixels determined in operation 1520 to the depth information of the peripheral depth pixels. For example, the color pixel depth information determiner 330 may divide a sum of values obtained by applying the weights of the peripheral depth pixels to the depth information of the peripheral depth pixels, by a number of the peripheral depth pixels.

Here, the color pixel depth information determiner 330 may add the determined depth information as the depth information of the current color pixel.

Figure 16:
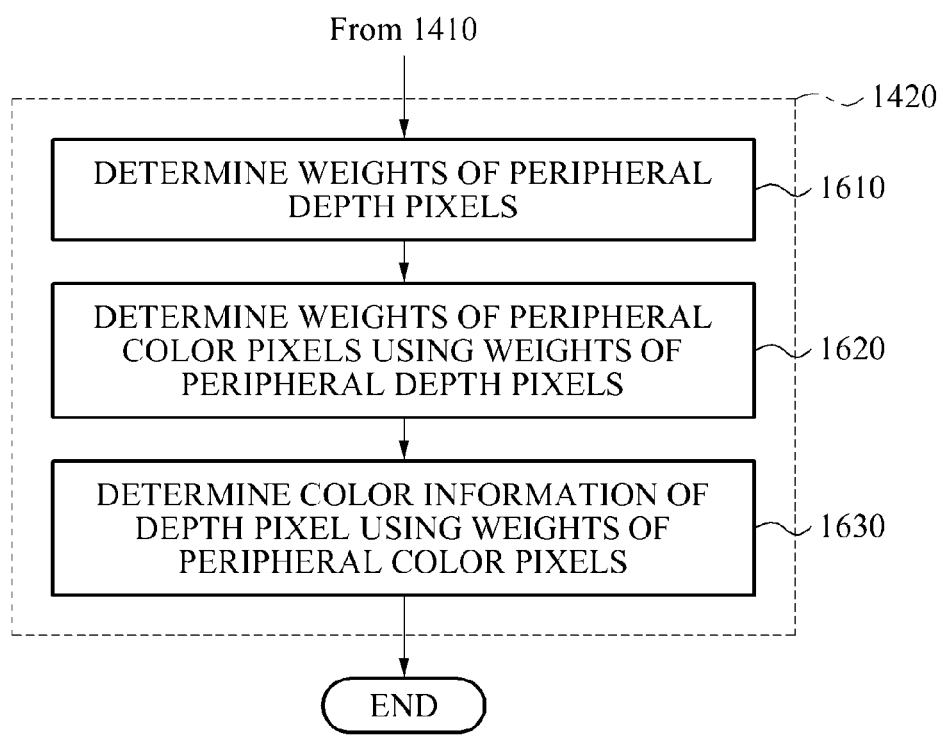
FIG. 16 illustrates a processing of determining color information of depth pixels, according to example embodiments.

FIG. 16 illustrates a processing of determining color information of depth pixels, according to example embodiments. Operations 1610 to 1630 of FIG. 16 may be included in operation 1420 of FIG. 14.

In operation 1610, the peripheral depth pixel weight determiner 810 may determine weights of peripheral depth pixels.

In detail, the peripheral depth pixel weight determiner 810 may compare a pixel value of the current depth pixel and pixel values of peripheral depth pixels, and determine the weights of the peripheral depth pixels according to the comparison result. For example, as a difference in pixel value between the current depth pixel and the peripheral depth pixels is smaller, the weights of the peripheral depth pixels may be determined to be higher.

In operation 1620, the peripheral color pixel weight determiner 820 may determine weights of peripheral color pixels using the weights of the peripheral depth pixels determined in operation 1610. Here, the peripheral color pixel weight determiner 820 may determine the weights of the peripheral color pixels with respect to RGB channels.

In addition, the peripheral color pixel weight determiner 820 may determine the weights of the peripheral color pixels using a difference between color information of symmetrical color pixels and color information of the peripheral color pixels. Here, the symmetrical color pixels may refer to color pixels which are symmetrical to the peripheral color pixels and have a same channel as the peripheral color pixels.

For example, the peripheral color pixel weight determiner 820 may compensate weights of directions corresponding to the peripheral depth pixels to be inversely proportional to the color information of the symmetrical color pixels and the color information of the peripheral color pixels. Next, the peripheral color pixel weight determiner 820 may determine the weights of the peripheral color pixels by combining the compensated weights.

In operation 1630, the depth pixel color information determiner 830 may determine color information per channel of the current depth pixel, by applying the weights of the peripheral color pixels determined in operation 1620 to the color information of the peripheral color pixels.

For example, the depth pixel color information determiner 830 may determine R channel color information of the current depth pixel, by dividing a sum of values obtained by applying weights of the R channel peripheral color pixels to the R channel color information of the R channel peripheral color pixels, by a number of the R channel peripheral color pixels. In addition, the depth pixel color information determiner 830 may determine G channel color information and B channel color information of the current color pixel using the G channel peripheral color pixels and B channel peripheral color pixels.

Here, the depth pixel color information determiner 830 may add the determined color information as the color information of the current depth pixel.

The methods according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The media may be transfer media such as optical lines, metal lines, or waveguides including a carrier wave for transmitting a signal designating the program command and the data construction. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. An image processing apparatus comprising:
   a memory having computer readable instructions stored thereon, and
   at least one processor configured to execute the computer readable instructions to,
      compare a pixel value of a current color pixel to pixel values of peripheral color pixels having a same channel as the current color pixel, among peripheral color pixels located within a predetermined region with respect to the current color pixel,
      determine weights of the peripheral color pixels such that the weights of the peripheral color pixels are inversely proportional to a difference between pixel values of the current color pixel and pixel values of the peripheral color pixels having a same channel as the current color pixel,
      compensate the weights of the peripheral color pixels such that the weights of the peripheral color pixels are inversely proportional to a difference between depth information of symmetrical depth pixels and depth information of peripheral depth pixels,
      determine weights of the peripheral depth pixels by combining the compensated weights, the peripheral depth pixels are depth pixels adjacent to the peripheral color pixels, and
      determine depth information of the current color pixel by applying the weights of the peripheral depth pixels to depth information of the peripheral depth pixels,
      wherein the symmetrical depth pixels are symmetrical to the peripheral depth pixels with respect to the peripheral color pixels, and
      the peripheral color pixels are located between the symmetrical depth pixels and the peripheral depth pixels.

2. The image processing apparatus of claim 1, wherein the at least one processor is further configured to execute the computer readable instructions to,
   determine the weights of the peripheral depth pixels located between the current color pixel and the peripheral color pixels using the weights of the peripheral color pixels determined according to a result of a comparison between the current color pixel and the peripheral color pixels.

3. The image processing apparatus of claim 2, wherein the at least one processor is further configured to execute the computer readable instructions to,
   determine the weights of the peripheral depth pixels based on a difference between depth information of symmetrical depth pixels and depth information of the peripheral depth pixels, the symmetrical depth pixels being symmetrical to the peripheral depth pixels with respect to the peripheral color pixels.

4. The image processing apparatus of claim 1, wherein the at least one processor is further configured to execute the computer readable instructions to,
   use the peripheral color pixels having a same channel as the current color pixel, among the peripheral color pixels located within a desired region with respect to the current color pixel if the current color pixel is any one of red, green, and blue (RGB) channels.

5. An image processing method comprising:
   comparing a pixel value of a current color pixel to pixel values of peripheral color pixels having a same channel as the current color pixel, among peripheral color pixels located within a predetermined region with respect to the current color pixel;
   determining weights of peripheral color pixels such that the weights of the peripheral color pixels are inversely proportional to a difference between pixel values of the current color pixel and pixel values of the peripheral color pixels having a same channel as the current color pixel;
   compensating the weights of the peripheral color pixels such that the weights of the peripheral color pixels are inversely proportional to a difference between depth information of symmetrical depth pixels and depth information of peripheral depth pixels;
   determining weights of the peripheral depth pixels by combining the compensated weights, the peripheral depth pixels are depth pixels adjacent to the peripheral color pixels; and
   determining depth information of the current color pixel by applying the weights of the peripheral depth pixels to depth information of the peripheral depth pixels,
   wherein the symmetrical depth pixels are symmetrical to the peripheral depth pixels with respect to the peripheral color pixels, and
   the peripheral color pixels are located between the symmetrical depth pixels and the peripheral depth pixels.

6. The image processing method of claim 5, wherein the determining weights of the peripheral depth pixels includes,
   determining the weights of the peripheral depth pixels located between the current color pixel and the peripheral color pixels using the weights of the peripheral color pixels, the weights of the peripheral color pixels determined according to a result of a comparison between the current color pixel and the peripheral color pixels.

7. The image processing method of claim 6, wherein the determining weights of the peripheral depth pixels includes,
   determining the weights of the peripheral depth pixels using a difference between depth information of symmetrical depth pixels and the depth information of the peripheral depth pixels, the symmetrical depth pixels being symmetrical to the peripheral depth pixels with respect to the peripheral color pixels.

8. The image processing method of claim 5, wherein the determining the weights of the peripheral depth pixels includes,
   using the peripheral color pixels having a same channel as the current color pixel if the current color pixel is any one of red, green, and blue (RGB) channels, the peripheral color pixels located within a desired region with respect to the current color pixel.

9. A non-transitory computer readable recording medium having computer readable instructions stored thereon, which when executed by at least one processor, configure the at least one processor to perform the method of claim 5.

10. An image processing method comprising:
- comparing a pixel value of a current color pixel to pixel values of peripheral color pixels having a same channel as the current color pixel, among peripheral color pixels located within a predetermined region with respect to the current color pixel;
- determining weights of peripheral color pixels such that the weights of the peripheral color pixels are inversely proportional to a difference between pixel values of the current color pixel and pixel values of the peripheral color pixels having a same channel as the current color pixel;
- compensating the weights of the peripheral color pixels such that the weights of the peripheral color pixels are inversely proportional to a difference between depth information of symmetrical depth pixels and depth information of peripheral depth pixels;
- determining weights of the peripheral depth pixels by combining the compensated weights, the peripheral depth pixels are depth pixels adjacent to the peripheral color pixels;
- determining depth information of the current color pixel by applying the weights of the peripheral depth pixels to depth information of the peripheral depth pixels; and
- determining color information of a current depth pixel using first pixels and second pixels,
- wherein the symmetrical depth pixels are symmetrical to the peripheral depth pixels with respect to the peripheral color pixels,
- the peripheral color pixels are located between the symmetrical depth pixels and the peripheral depth pixels,
- the first pixels are peripheral color pixels of the current depth pixel, and
- the second pixels are peripheral depth pixels of the current depth pixel.

* * * * *